Oct. 29, 1935.　　G. H. CONNORS　　2,018,838
TRAILER TYPE DUMPING VEHICLE
Filed Sept. 14, 1934　　6 Sheets-Sheet 2

Inventor
GEORGE H. CONNORS.

By Robert Cobb
Attorneys

Oct. 29, 1935.   G. H. CONNORS   2,018,838
TRAILER TYPE DUMPING VEHICLE
Filed Sept. 14, 1934   6 Sheets-Sheet 5

Inventor
GEORGE H. CONNORS.
By Robert Robb
Attorneys

Patented Oct. 29, 1935

2,018,838

UNITED STATES PATENT OFFICE 2,018,838

TRAILER TYPE DUMPING VEHICLE

George H. Connors, Edgerton, Wis., assignor to Highway Trailer Company, Edgerton, Wis., a corporation Application September 14, 1934, Serial No. 744,085

1 Claim. (Cl. 298—21)

The present invention has relation to automotive vehicles of the class generally referred to today as tractor-trailer combination vehicles wherein the traction or pulling vehicle carrying the motive power is capable of connection and disconnection from a trailer or pay-load vehicle commonly called a semi-trailer.

It has been proposed before in this field of combination vehicles to employ a dumping trailer vehicle structure wherein the trailer body is mounted on the trailer frame and equipment is provided for raising and lowering the body relatively to its frame or chassis whereby to obtain the dumping action.

The present invention aims to obtain a construction of dumping trailer wherein the dumping operation of the trailer body is obtained by elevation or raising of the trailer chassis and pay-load body as one unit. This is particularly advantageous in that it eliminates the necessity for providing an independent trailer chassis and body frame movably mounted thereon such as heretofore have been required both in respect to trailer and truck dumping body vehicles.

In the employment of tractor-trailer combination vehicles, the trailer or pay-load body is connected with the traction vehicle customarily by means of a fifth wheel arrangement or device which enables the detachment of the trailer from a tractor, usually to facilitate the loading of the trailer body whilst the traction vehicle is being used elsewhere for the pulling of another trailer or other trailers to a place of unloading or for reloading.

In the carrying out of the present invention it is contemplated, in order to obtain the advantage of a unit construction of trailer and pay-load body, that the lifting or raising means for causing dumping action of the trailer body shall be directly connected with the fifth wheel member at the front end of the trailer, thereby to enable the direct elevation of the trailer chassis and body thereon. To this end the trailer body raising or elevating device of the present invention is mounted upon the traction vehicle for direct cooperation and lifting of the fifth wheel device which is carried by said vehicle and which is connected with the fifth wheel device of the trailer. It is believed that the provision of elevating means for the fifth wheel mechanism intermediate the tractor and trailer vehicles as presented in this invention is a unique and novel provision not heretofore used.

When the dumping operation for a trailer body involves the complete bodily elevation of the trailer chassis and body as a unit, a relative bodily movement of the trailer vehicle and the tractor vehicle is compelled, and this involves a movement of the trailer upon its supporting wheels toward the tractor, or a movement of the tractor rearwardly toward the trailer. In other words, a sort of jackknifing movement of the trailer and tractor vehicles is required when the dumping operation of the trailer body is effected, and then, when the dumping is completed and the vehicles are to be restored to their traveling positions, the trailer body and chassis are lowered so that the vehicles become horizontally aligned as usual. By reason of the foregoing phase of operation of the combination vehicles, it is contemplated, according to the novel provisions of this invention, to provide brake equipment so that power brakes may be applied to the trailer to hold that vehicle stationary and cause the tractor to back rearwardly relatively thereto to effect dumping, and likewise independent braking mechanism is employed for the tractor so that if the tractor brakes be applied and the trailer brakes unapplied, the dumping operation obtained by jacking-knifing the trailer relatively to the tractor will bring the trailer by bodily movement in the direction of the tractor.

The present invention includes additionally novel features of mechanism such that the drive action of the power take-off devices which are used to raise and lower the trailer for dumping may be automatically discontinued when the trailer chassis and its body have been elevated to the predetermined limit of movement or full dumping position; and such that this drive action may likewise be discontinued when the trailer has been lowered under power control to its normal traveling position.

This invention includes also the employment of control parts associated with the mechanism last above referred to, such that there is no liability of shifting of the power take-off mechanism in a manner that would produce operation of the raising and lowering devices for the trailer in the wrong direction. In other words, when the trailer is down in its normal position, the controlling means for the power take-off cannot be operated wrongly to attempt to lower the trailer any further; and when the trailer has been elevated to its dumping position, it is impossible, by reason of the control mechanism, for the trailer to be moved beyond the limit of its complete dumping inclination.

This invention involves certain more specific and detailed features of construction of special advantage and novelty as will be more fully set forth in conjunction with the following detailed description and the annexed drawings, in which—

Figure 1:
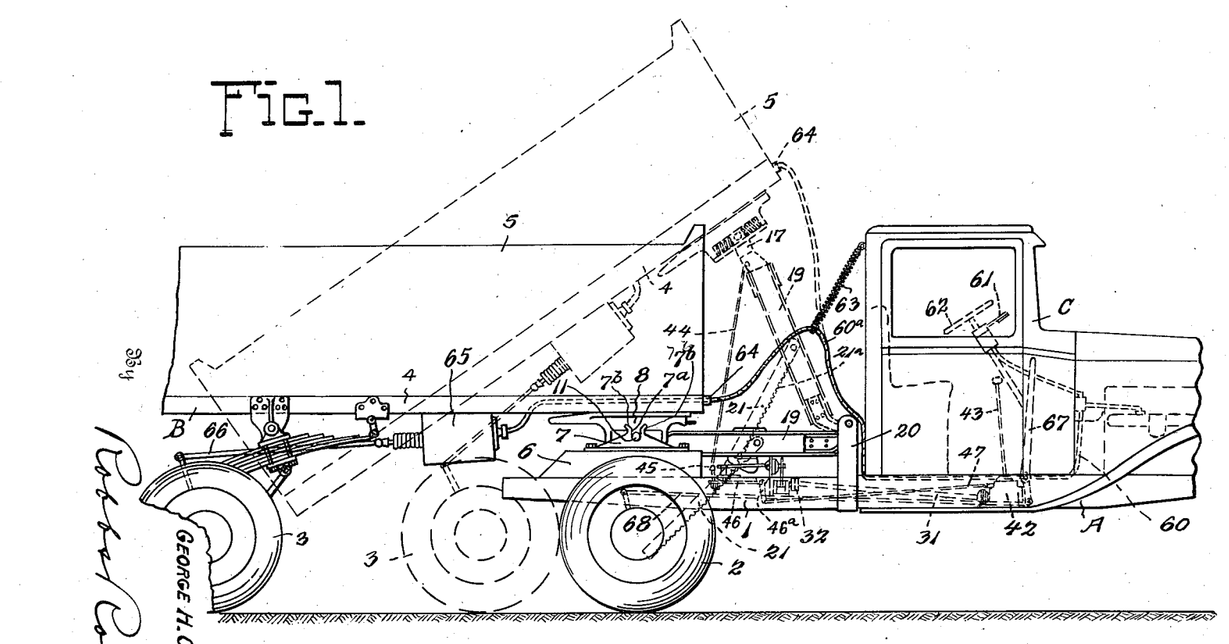
Figure 1 is a side elevation of a tractor-trailer combination vehicle illustrating the invention applied thereto and showing in dotted lines the trailer raised to its full dumping position.
Figure 2:
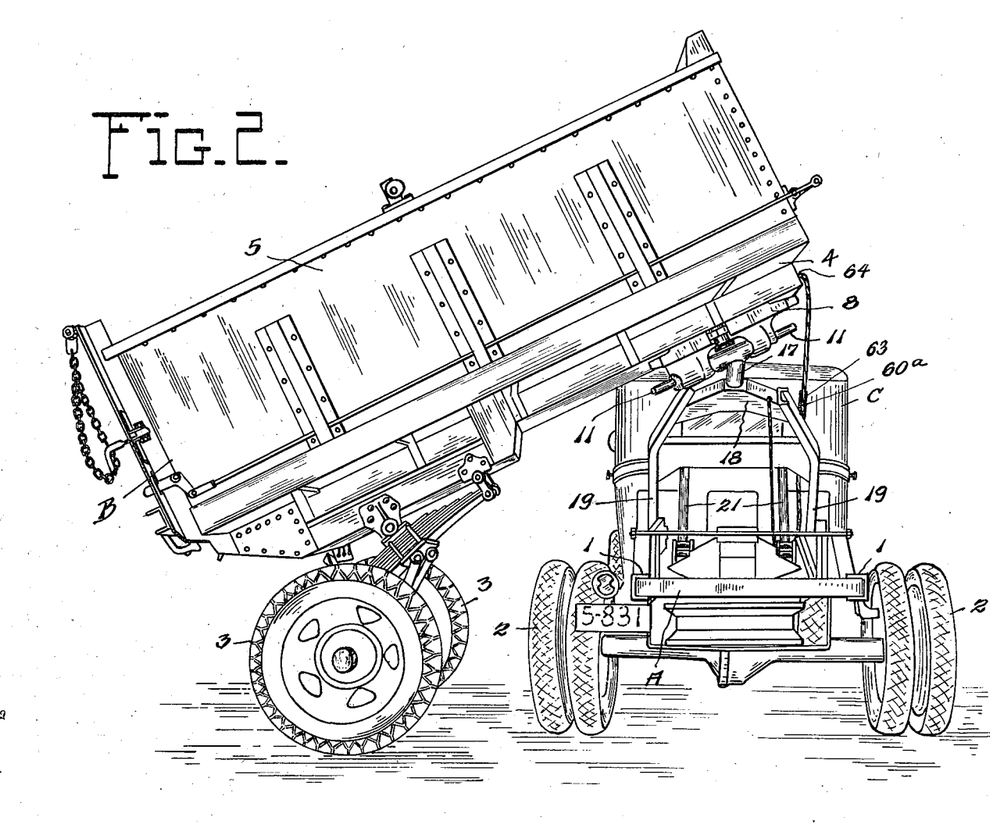
Figure 2 is an illustration in perspective of the combination vehicle above referred to, showing how the trailer may be adjusted at a greater or lesser angle in reference to the tractor vehicle and the elevation of the trailer performed effectively for adjusting the same for its dumping operation.

Setting forth the general features of the tractor-trailer vehicle combination with which the present invention is used, reference is made to Figure 1 in which the tractor vehicle is designated A and the trailer vehicle is designated B. The tractor vehicle A comprises a suitable chassis or frame 1 mounted upon the rear wheels 2 and having the usual front wheels and steering mechanism, not illustrated. The cab of the tractor vehicle is designated C. The trailer B, which is the pay-load vehicle, is, generally speaking, of a known type commonly called a semi-trailer, equipped as shown in Figures 1 and 2 with the rear supporting or traveling wheels 3 and comprising also the chassis or frame 4 and pay-load body 5. The type of body illustrated may be usually employed for the transporting of coal or the like, but this phase of construction is immaterial so long as the body 5 is one of a design adapted for dumping the contents thereof when the front end of the body is elevated. Upon the rear end of the tractor chassis or frame 1 are carried bolster blocks 6 upon which are supported saddle members 7 which form a part of the tractor fifth wheel mounting means.

Figure 3:
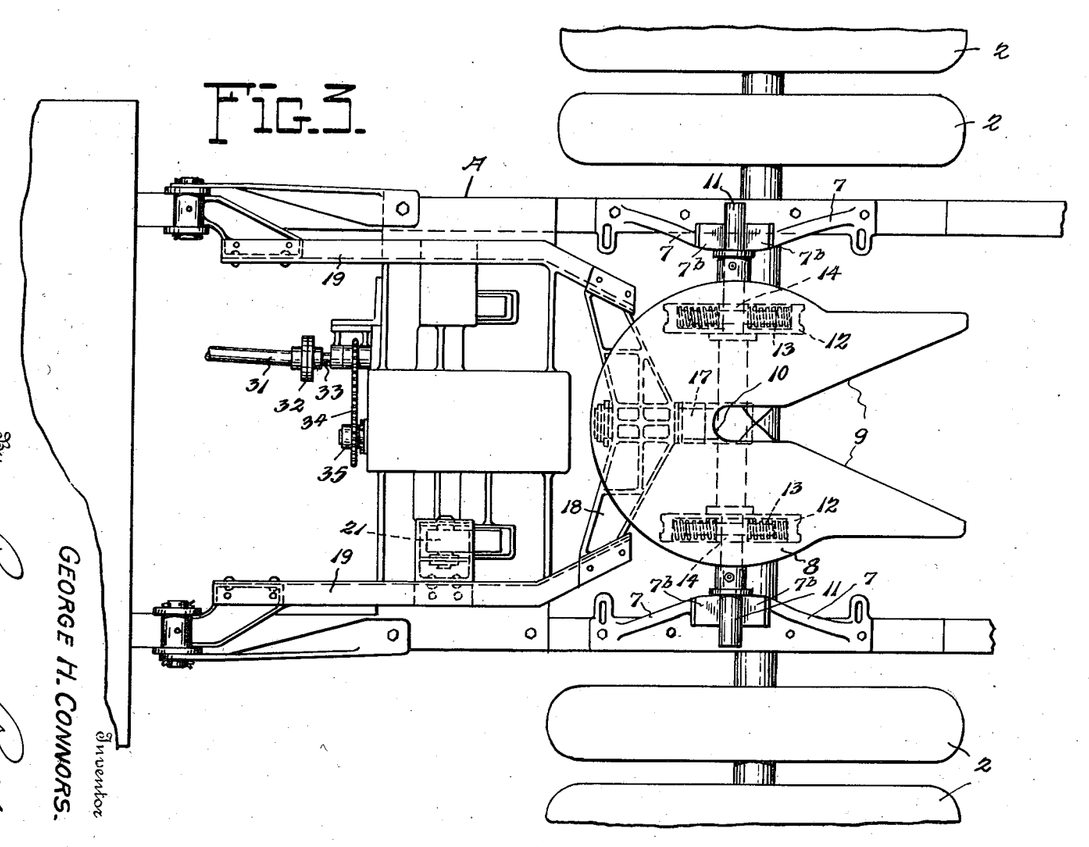
Figure 3 is a partial plan view bringing out more clearly the method of mounting the tractor fifth wheel upon the lifting frame or member of the same vehicle, some of the parts of the lifting mechanism itself that are associated with said lifting member being shown.
Figure 4:
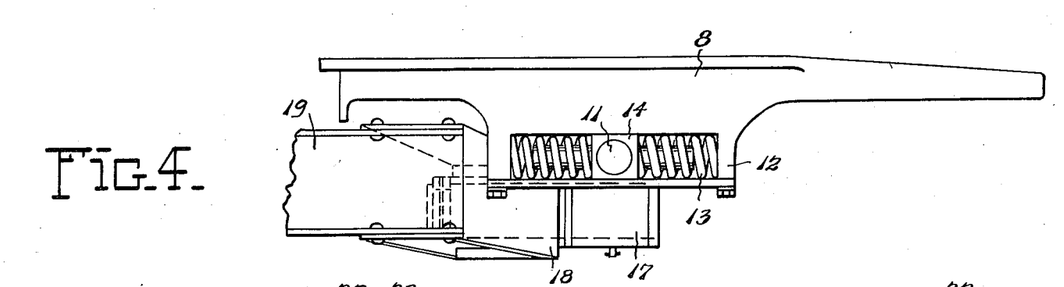
Figure 4 is a fragmentary side view bringing out a little more clearly the mounting means between the tractor fifth wheel and lifting member.

As seen best in Figure 3, the tractor fifth wheel 8 is of a well-known type embodying the split fifth wheel structure providing the V-opening 9 for centering and guiding the king pin on the trailer into the king pin receiving socket 10 of said fifth wheel 8. This fifth wheel 8 may be said generally to be of the design of the Martin et al. Patent No. 1,412,025, the spring mounting parts being substantially the same to accommodate the rearward and forward yielding or cushioning of the fifth wheel 8. Said fifth wheel 8 is mounted for fore and aft tilting movement by means of a cross shaft 11, the ends of which are received in the recesses 7a of the saddle members 7, said recesses 7a being formed with divergent guide members 7b to facilitate the entry of the ends of the shaft into said recesses after the trailer body B has been raised and in the process of lowering the same to its original or normal traveling position.

It is customary, as above indicated, for fifth wheels 8 of the type of the invention to be mounted for resilient or yielding fore and aft movement to absorb the shocks of the coupling of the tractor with the trailer as the tractor is backed into the trailer to cause the entry of the king pin on the front end of the latter, into the socket 10 of the fifth wheel. The shock absorbing means comprises boxings or housings 12 enclosing coiled springs 13 engaging with the opposite sides of bearing members 14 that receive the shaft 11 and properly connect and hold the shaft on the fifth wheel 8. This affords a construction such that the fifth wheel 8 may move bodily forwardly and rearwardly relative to its mounting upon the shaft 11 on which it is tiltable and by which it is supported upon the tractor in a detachable manner by reason of the saddle members 7.

Thus far, therefore, there has been set forth a fifth wheel construction and mounting means carried by the tractor but which is elevatable in reference to the latter, to be lifted simultaneously with the elevation of the front end of the trailer in a manner now to be more fully set forth.

Figure 5:
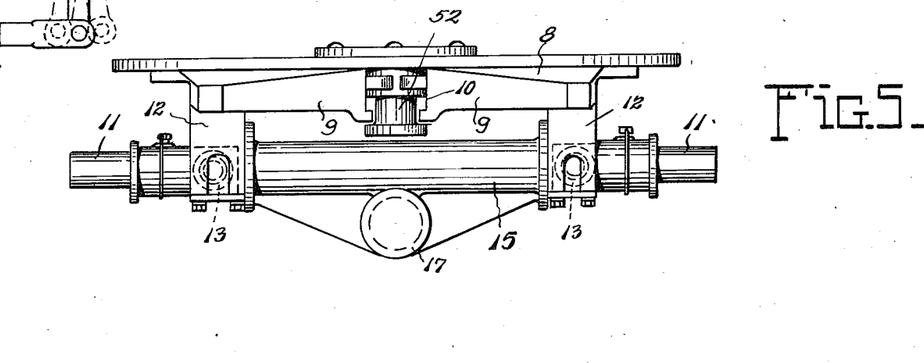
Figure 5 is a view of certain of the parts shown in Figure 4, viewing the fifth wheel from the rear.

The trailer and fifth wheel lifting means comprises a tubular or sleeve-like bearing and supporting member 15, see Figure 5, through which the shaft 11 passes, said shaft likewise passing through the housings 12 which extend downwardly from the under-side of the fifth wheel 8 to afford the rocking mounting enabling the tilting action of said fifth wheel. The ends of the shaft 11 are freely exposed so that they may freely pass through and out of the recesses 7a of the saddle members 7 previously referred to. The supporting member 15, relative to which the fifth wheel has pivotal movement, is equipped with a forwardly extending trunnion member 17 mounted in a suitable bearing in the crosspiece or head 18 of the lifting member or frame 19, the operation of which under power causes the raising and lowering movement of the fifth wheel and front end of the trailer. The lifting member 19 may be said to be somewhat of the form of an A-frame, the sides or legs of which are pivoted to vertical supporting brackets 20, see Figure 1, on the frame or chassis of the tractor A at a point somewhat in advance of the mounting of the fifth wheel 8 upon said tractor.

The connection of the lifting member or frame 19 with the fifth wheel is established by the trunnion member 17 disposed longitudinally or parallel with the surface of the combination tractor-trailer vehicle, thus allowing for movement of the fifth wheel about such axis member 17. Additionally the said connection is established by the transverse axis mounting of the shaft 11 which passes through the supporting sleeve or member 15 so that in practical effect a universal joint connection is created between the fifth wheel 8 and the lifting member or frame 19 owing to the employment of the axis members 11 and 17 at right angles to each other.

Figure 6:
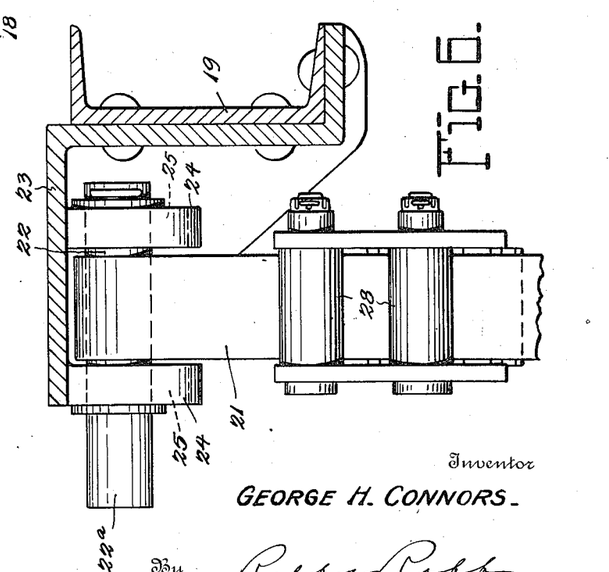
Figure 6 is a fragmentary view, partly in elevation and partly in section, showing a side of the lifting frame or member with its offstanding bracket connected to the lifting rack, the said lifting rack, and the guide yoke with which the rack operates.
Figure 7:
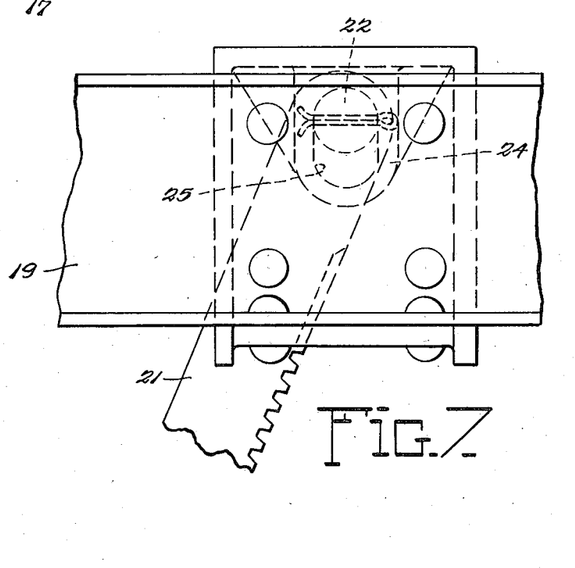
Figure 7 is a side view looking laterally toward the parts as shown in Figure 6 and bringing out the lifting pin and slot connection between the upper end of one of the lifting racks and an offstanding bracket of the lifting member of the frame.
Figures 8, 9, 10:
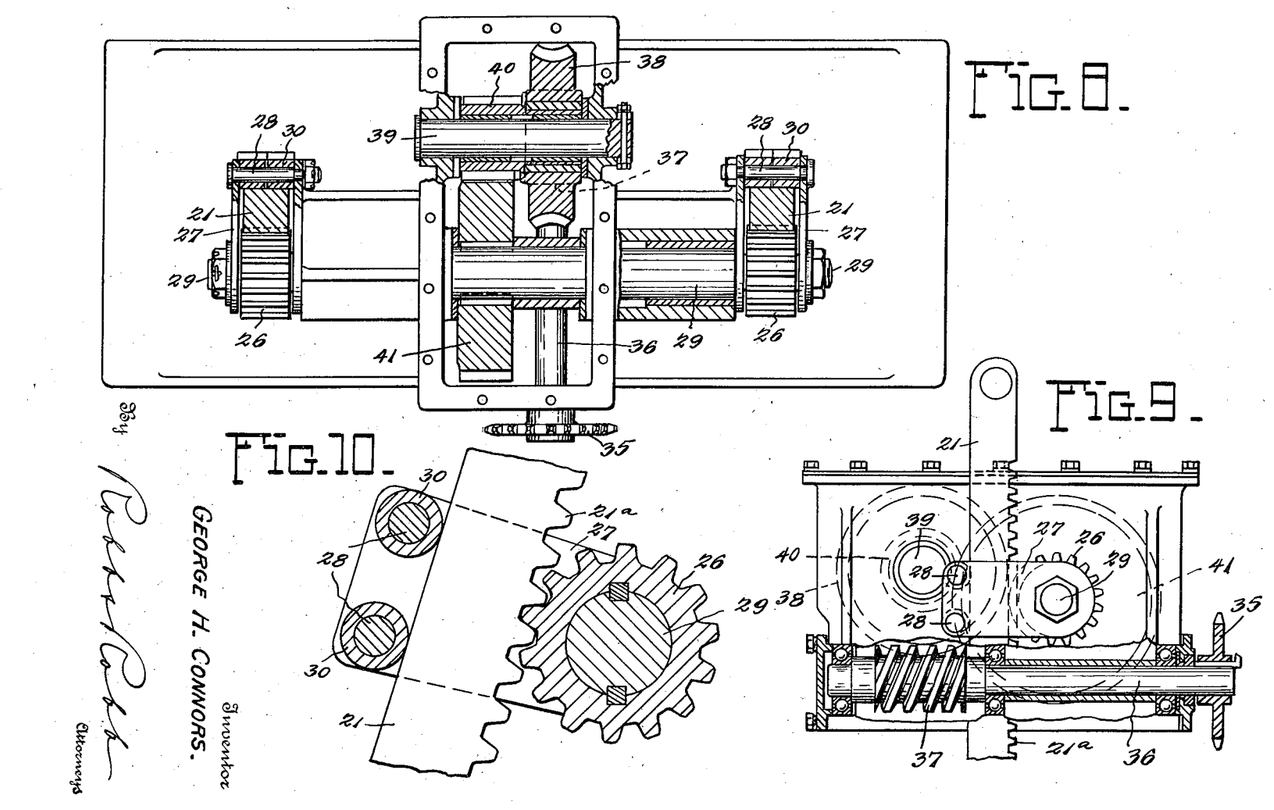
Figure 8 is a sectional view with some parts illustrated in plan, looking down on the power transmitting devices intermediate the power take-off shaft and the lifting racks.
Figure 9 is a view of certain of the parts shown in Figure 8, looking from a point at the left of Figure 8, and illustrating more clearly the drive worm shaft, drive worm, and driven worm gear of the said power transmitting gearing.
Figure 10 is a view showing more fully the pinion drive for one of the lifting racks and the yoke which is illustrated in Figure 6.

For the lifting of the trailer and the fifth wheel 8 for dumping operation of the former, there are provided lifting bars 21, the upper ends of which are pivotally connected by pivot pins 22 with brackets 23 that project inwardly from the sides of the lifting member or A-frame 19. The pins 22 pass through pivot lugs 24 which, as seen in Figure 7, are elongated to provide vertical slots 25 for a purpose to be more fully presented hereinafter. Formed on the lifting bars 21 are two racks 21a which mesh with the teeth of lifting pinions 26, the racks being held in engagement with the said pinions by means of pivoted yokes 27, see Figures 10 and 6, the yokes having rollers 28 to travel in contact with the smooth sides of the lifting bars. The yokes are therefore free to swing on the pinion shaft 29 to which the lifting pinions 26 are keyed, and hardened bushings 30 on the rollers 28 are provided to protect the rollers against wear. The yokes 27 are required to be permitted to swing in view of the fact that the angularity of the lifting bars 21 changes during the raising and lowering of the lifting member or frame 19.

The pinion shaft 29 which drives the pinions 26 for the lifting operation is designed to be operated by power taken off from the engine of the tractor vehicle A. To the above end any suitable type of power take-off mechanism from the transmission of the tractor vehicle may be availed of, the transmission housing being supplied with a power take-off opening on a side thereof for carrying the drive of the transmission gearing to a power take-off drive shaft 31, see Figure 3, connected by a flexible joint 32 with the aligned short shaft 33 on which is keyed a drive sprocket connected by a sprocket chain 34 to a driven sprocket 35, see Figure 8. The sprocket 35 is mounted upon a worm shaft 36 having the driving worm 37 engaging the driven worm gear 38 keyed to a countershaft 39 arranged parallel to the pinion shaft 29. The worm gear shaft 39 carries the spur gear 40 meshing with a spur gear 41 keyed to the pinion shaft 29, and by the gearing just described the power may be transmitted through the power take-off means to the lifting pinions 26 on the pinion shaft 29 aforesaid. The drive from the transmission gearing in the transmission housing 42 of the tractor vehicle is controlled by the customary control lever 43, which, when shifted into one position, will cause turning of the drive shaft 31 in one direction, when shifted in another position will cause rotation of said shaft 31 in a reverse direction, and when the lever 43 is placed at neutral, the said power take-off drive shaft 31 will be idle. Since the power take-off mechanism at the transmission housing 42 is of a conventional type, the details thereof are immaterial to the invention and are not fully illustrated because well known to those versed in this art.

It is obvious that when the lever 43 is adjusted to cause operation of the shaft 31 for elevation of the trailer when it is in the full line position of Figure 1, the power drive will be transmitted to the pinion shaft 29, causing rotation of the pinions 26 and upward movement of the lifting bars 21 through the instrumentality of the driving worm gearing including the parts 38, 39, 40, and 41. Obviously, the worm gearing employed affords a self-locking action so that the pay-load body or trailer may, if desired, be stopped in any position during its upward movement and held in such position. The foregoing likewise is true so far as downward movement of the pay-load body or trailer is concerned.

In the normal use of the invention the trailer will be elevated to its dumping position by raising it the maximum distance of its movement under the lifting force of the lifting member 19. Likewise, when the trailer is lowered, it will ordinarily be moved downwardly until it reaches the horizontal position of Figure 1, which is the limit of its downward movement. According to the invention it is contemplated to provide automatic throw-out means cooperative with the control lever 43 whereby, when the trailer B has been elevated to its maximum extent of movement for dumping, the drive on the power take-off shaft 31 will be discontinued. This automatic mechanism includes also supplemental devices such that when the trailer B is lowered by adjustment of the lever 43 controlling a reverse driving of the shaft 31, and the trailer reaches its lower limit of movement, the drive of the power take-off mechanism will again be discontinued automatically.

Figure 11:
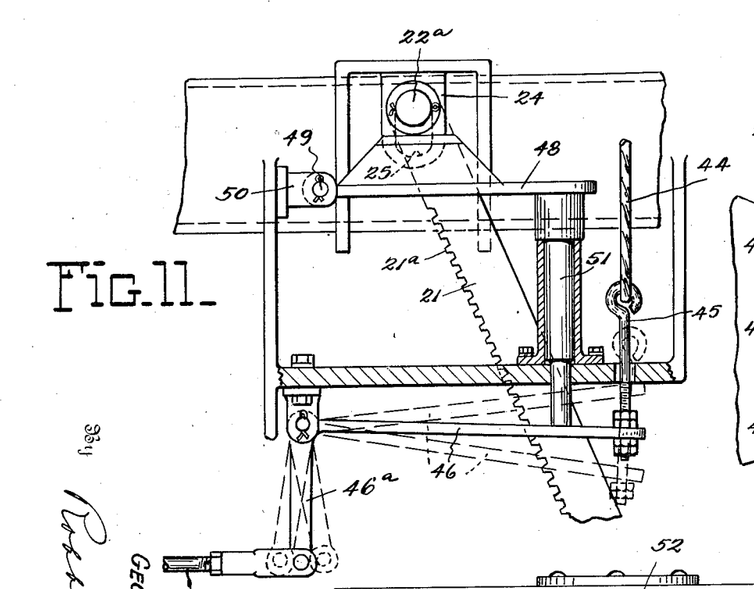
Figure 11 is a fragmentary view illustrating more fully the knock-out mechanism which controls the discontinuance of the drive action of the power take-off mechanism at the upper limit of dumping movement of the trailer and at the limit of the lowering movement of the trailer.
Figure 12:
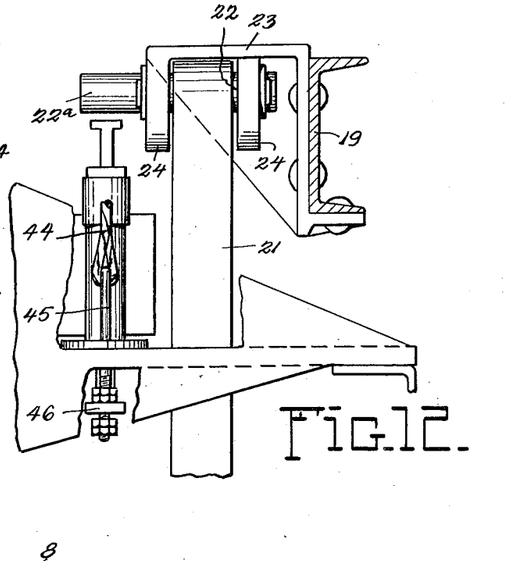
Figure 12 is a view of the parts shown in Figure 11, but looking at them from the right side of said parts of Figure 11.

The instrumentalities for accomplishing the last mentioned objects are shown best in Figures 1, 11 and 12. They include the cable 44 which is attached to the rear end of the lifting member 19, which cable is caused to be pulled in an upward direction as the lifting member 19 rises to move the trailer to its dumping angle or position. As the lifting member 19 reaches that point in its upward movement representing the upward limit of movement of the trailer body for dumping, a pull is exerted on the cable 44 which is transmitted by the I-bolt connection 45, see Figure 11, to a bell crank lever 46, to the horizontal arm of which the cable is thus attached. This causes a rocking movement of the said lever 46 imparting movement to its vertical arm 46a in such a manner as to cause longitudinal movement of the actuating rod 47, which leads from the said arm 46a to the gear engaging slide in the transmission housing 42, which slide, not shown, is operated by the lever 43. In this way, through the movement of the cable 44 and the actuating effect of the rod 47, the power take-off gearing in the transmission housing 42 and the lever 43 are moved to neutral position, and the power take-off drive on the lifting pinion shaft 29 and upward movement of the lifting bars 21 are thus immediately discontinued.

According to the foregoing description, the trailer B will have been raised to its maximum limit of elevation for dumping and held in such position until the dumping is completed. Thereupon the operator, by actuation of the lever 43 now at its neutral adjustment, will throw in the power take-off for the downward movement of the trailer to assume its normal horizontal traveling position, this downward movement being caused by an operation of the pinion shaft 29 reversely to that previously described for the elevation of the trailer body. As the trailer body reaches the lower limit of its movement, an extension 22a on one of the pivot pins 22 strikes a pivoted arm 48 pivoted at 49 to a bracket 50. The pivoted arm 48 coacts with a plunger 51, which plunger is arranged to strike the bell crank lever 46 just at the time the pay-load body or trailer B reaches the downward limit of its movement. The impingement of the plunger 51 against bell crank lever 46 will thus shift this bell crank lever in a direction opposite to that in which it is shifted by the action of the cable 44 as previously described. The reverse shifting of the lever 46 in the manner just set forth imparts movement to the rod 47 so as to again neutralize the power take-off gearing shifting the control lever 43 to its neutral position, ready for a subsequent operation such as has just been completely set forth. The slots 25 in the lugs 24 that connect the lifting bars 21 with the lifting member 19 are intended to allow the lifting bars to continue to move a slight distance downwardly after the trailer or pay-load body B has been returned to its position with the fifth wheel 8 dropped into place on the tractor, the ends of the shaft 11 suitably re-engaged with or re-received within the recesses 7a in the saddle members 7. The above construction insures that no part of the trailer load will be carried directly on the lifting bars 21, or the lifting member 19, or any other parts of the hoisting mechanism, when the trailer unit is supported with the fifth wheel on the tractor, and during the travel of the trailer and tractor vehicles on the road.

It is noted that the several control parts 48, 49, 50, 51, 45, 46, and 46a, are carried by the main frame or chassis of the tractor, being disposed in a position such that the arm 48 of course is in the path of movement of the extension 22a of one of the pins 22 by which the lifting bars 21 are connected with the lifting member 19.

It is evident from Figure 1 of the drawings that in the action of elevating the trailer B to its dumping position, if the tractor brakes are locked or applied, the operation of the lifting member 19 will cause a bodily movement of the trailer forwardly toward the tractor, the trailer under such conditions traveling freely upon its supporting wheels 3 which move toward the rear wheels 2 of the tractor. When this operation takes place the brakes for the trailer will of course not be applied. On the other hand, if it be desired to dump the trailer by inclining it without any forward or bodily movement, the brakes of the trailer may be applied, and if the tractor brakes are unapplied, the action of elevation of the trailer as effected by the lifting member 19 will result in the pulling rearwardly of the tractor toward the rear wheels of the trailer. In other words, the performing of the operation of moving the trailer to its dumping position necessitates a relative movement of the tractor and trailer for obvious reasons, in the light of the foregoing description. The trailer brakes will be controlled from the tractor and these brakes may be pneumatically or electrically operated from the cab of the tractor. Pneumatic brakes involve the use of a pressure line which runs from the tractor backwardly to a coupling at the front end of the trailer and then runs along the trailer chassis rearwardly toward the brake applying instrumentalities to allow for the upward movement of the trailer when shifted to dumping position; a certain amount of slack in this pressure line will be provided intermediate the front end of the trailer and the tractor.

The brake system employed, and above referred to, may be of any conventional type, the brake pressure line being designated at 60 in Figure 1 of the drawings and being under the control of the hand lever 61 adjacent to the steering wheel 62. The pressure line 60 extends rearwardly under the cab and is provided with a slack portion 60a which is connected with a coiled tension spring 63 attached to the back of the cab. The pressure line is adapted to be detachably connected with the front end of the trailer at the point 64 and extends to the motor 65 which is adapted to actuate the brake rods 66 and the usual brake equipment for the rear wheels of the trailer B. Suitable mechanical brakes for the rear wheels of the tractor vehicle C operable by the lever 67 and including the brake rods 68, shown in dotted lines in Figure 1, are also employed. The purpose of the spring 63 is to take up the slack in the slack portion 60a of the pressure line 60 when the trailer body 5 is in its lowered normal traveling position.

While the trailer brake system features are conventional as stated, they differ from the ordinary tractor-trailer system in that the brakes acting on the trailer wheels are controllable independently of those acting on the tractor, this being necessary by reason of the actions desired in holding the trailer when raising the trailer body, or holding the tractor when so doing.

One of the desirable advantages of the present construction, as to operation, is illustrated by the adjustment of the vehicle parts in Figure 2 of the drawings. Owing to the fact that the fifth wheel 8 which cooperates with the king pin 52 of the trailer, see Figure 5, is peculiarly joined to the lifting member 19, as previously set forth, in such a manner as practically to afford a universal joint connection between the trailer and said lifting member, the trailer body may be disposed at an angle, even at right angles, to the tractor and lifted to dumping position while so arranged. This is an important method of operation of the invention because at times it is almost necessary to back the tractor-trailer vehicle combination into a narrow alley or space in which it would be impossible for the tractor to be longitudinally aligned with the trailer at the time of dumping. Therefore, the dumping operation may be accomplished in much less space than under the conditions of a longitudinal alignment of the tractor and trailer vehicles. The parts 6 constitute practically wood risers and are intended to be of a correct thickness to support the fifth wheel properly according to the frame height of different makes of tractors. It is well known that the channels and chassis or frame of tractors are made of different vertical dimensions and hence the foregoing provision to accommodate for the application of the invention to different styles or constructions of tractor vehicles at present in use. It is to be borne in mind of course that the brakes for the tractor are independent of the brakes for the trailer in order to permit of the separate operation of these brakes for the purposes previously set forth regarding the holding from movement of either the trailer or tractor.

Having thus described my invention, what I claim as new and desire to secure by Letters Patent of the United States, is:—

In combination, a tractor vehicle, a trailer vehicle, a fifth wheel on the tractor vehicle, a king pin carried by the trailer vehicle for connecting engagement with the fifth wheel of the tractor vehicle, a power operated lifting device on the tractor vehicle connected with the said fifth wheel for elevating the fifth wheel and thereby raising the connected end of the trailer, a universal joint connection between the said fifth wheel and the said lifting device, said universal joint connection comprising a trunnion member disposed longitudinally of the tractor and journaled in the lifting device, and a transverse axis member for the fifth wheel carried by said trunnion member and including a hollow sleeve through which said transverse axis member passes, said trunnion member being mounted upon said sleeve, and resilient means interposed between the fifth wheel and said transverse axis member.

GEORGE H. CONNORS.